(12) United States Patent
Kim et al.

(10) Patent No.: US 10,764,937 B2
(45) Date of Patent: Sep. 1, 2020

(54) METHOD AND WIRELESS DEVICE FOR TRANSMITTING RRC MESSAGE WHEN USING CP CIOT EPS OPTIMIZATION

(71) Applicant: LG Electronics Inc., Seoul (KR)

(72) Inventors: Jaehyun Kim, Seoul (KR); Taehun Kim, Seoul (KR); Jinsook Ryu, Seoul (KR); Sangmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/092,951

(22) PCT Filed: Jan. 9, 2017

(86) PCT No.: PCT/KR2017/000281
§ 371 (c)(1),
(2) Date: Oct. 11, 2018

(87) PCT Pub. No.: WO2017/179801
PCT Pub. Date: Oct. 19, 2017

(65) Prior Publication Data
US 2019/0132889 A1 May 2, 2019

Related U.S. Application Data

(60) Provisional application No. 62/321,231, filed on Apr. 12, 2016.

(51) Int. Cl.
*H04W 76/10* (2018.01)
*H04W 24/02* (2009.01)
(Continued)

(52) U.S. Cl.
CPC .............. *H04W 76/10* (2018.02); *H04W 4/00* (2013.01); *H04W 4/70* (2018.02); *H04W 24/02* (2013.01)

(58) Field of Classification Search
CPC .................................................... H04W 76/10
See application file for complete search history.

(56) References Cited

U.S. PATENT DOCUMENTS

| 2010/0165940 | A1 | 7/2010 | Watfa et al. |
| 2013/0079006 | A1* | 3/2013 | Cho ........................ H04W 8/06 455/435.1 |

(Continued)

FOREIGN PATENT DOCUMENTS

| KR | 1020160013958 | 2/2016 |
| WO | WO2016024790 | 2/2016 |

OTHER PUBLICATIONS

International Search Report in International Application No. PCT/KR2017/000281, dated Apr. 12, 2017, 4 pages.

(Continued)

*Primary Examiner* — John D Blanton
(74) *Attorney, Agent, or Firm* — Fish & Richardson P.C.

(57) ABSTRACT

Provided is a method for a wireless device for transmitting an RRC message according to one disclosure of the present specification. The method may comprise a step for an NAS stratum of the wireless device transmitting an NAS signaling request message to an AS layer to transmit the former to a network node. The NAS signaling request message can comprise therein an indication of one or both preferred or required plans from among the plans for optimizing the EPS for CIoT using a control plane (CP) or a user plane (UP). The method may comprise a step for the NAS stratum of the wireless device receiving, from the AS stratum, an NAS signaling acceptance message or NAS signaling rejection message from the network node.

12 Claims, 14 Drawing Sheets

(51) Int. Cl.
*H04W 4/00* (2018.01)
*H04W 4/70* (2018.01)

(56) References Cited

U.S. PATENT DOCUMENTS

2013/0265937 A1 10/2013 Jain et al.
2014/0029530 A1 1/2014 Kim et al.
2014/0355417 A1 12/2014 Kim et al.

OTHER PUBLICATIONS

3rd Generation Partnership Project; Technical Specification Group Services and System Aspects; "General Packet Radio Service (GPRS) enhancements for Evolved Universal Terrestrial Radio Access Network (E-UTRAN) access (Release 13)," 3GPP TS 23.401 V13.6.1, dated Mar. 24, 2016, 365 pages.
Extended European Search Report in European Application No. 17782558.5, dated Aug. 19, 2019, 8 pages.

* cited by examiner

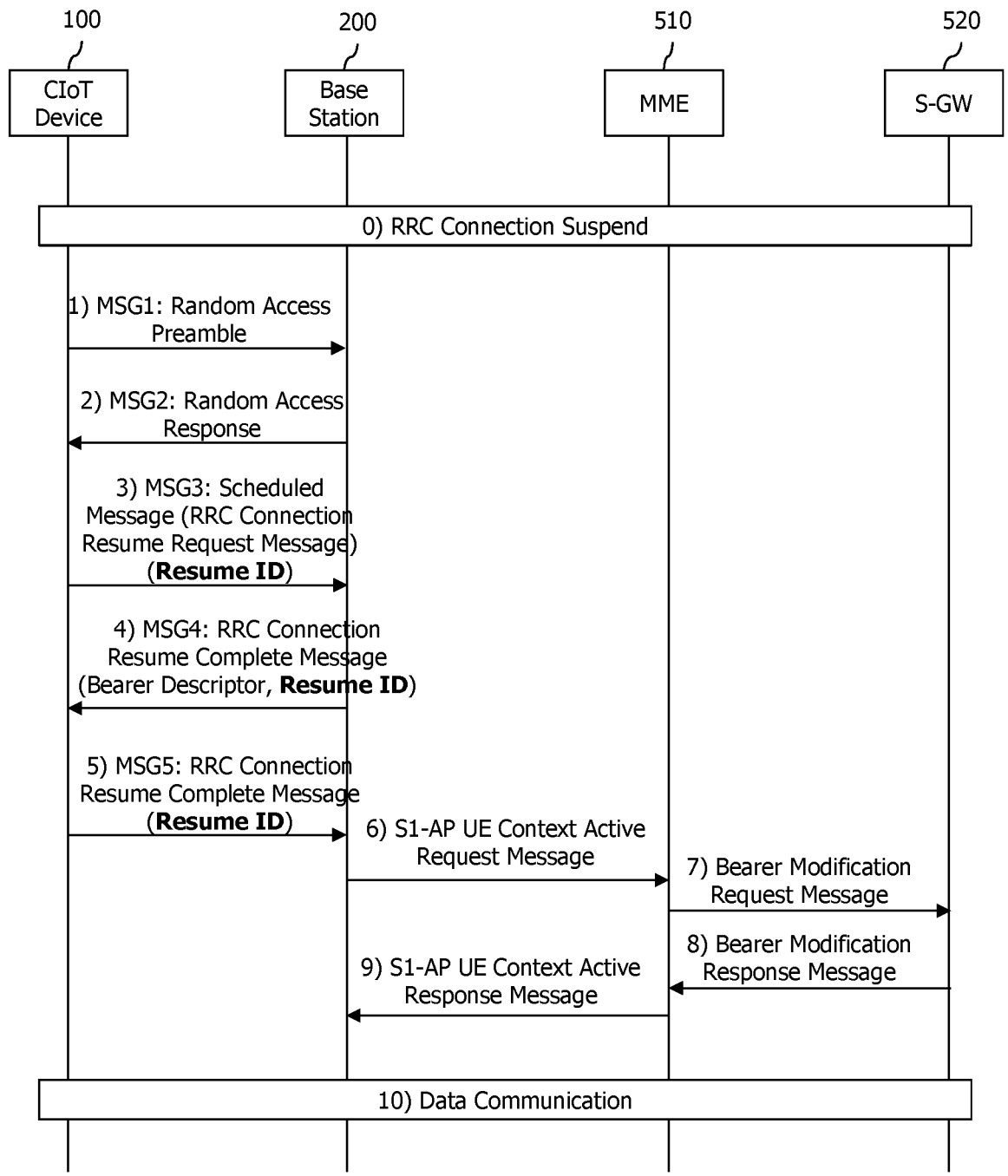

METHOD AND WIRELESS DEVICE FOR TRANSMITTING RRC MESSAGE WHEN USING CP CIOT EPS OPTIMIZATION

CROSS-REFERENCE TO RELATED APPLICATIONS

This application is the National Stage filing under 35 U.S.C. 371 of International Application No. PCT/KR2017/000281, filed on Jan. 9, 2017, which claims the benefit of U.S. Provisional Application No. 62/321,231 filed on Apr. 12, 2016, the contents of which are all hereby incorporated by reference herein in their entirety.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference may be made to 3GPP standard documents TS 23.401 and TS 23.402. A network configuration of FIG. 1 has been briefly reconfigured from the EPS higher level reference model.

FIG. 1 illustrates the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets may be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 may support policy enforcement features, packet filtering, charging support, etc. Furthermore, the PDN GW (or P-GW) 53 may play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability may access an IP service network (e.g., IMS), provided by a service provider (i.e., an operator), via various elements within an EPC based on non-3GPP access as well as based on 3GPP access.

Furthermore, FIG. 1 illustrates various reference points (e.g., S1-U and S1-MME). In a 3GPP system, a conceptual link that connects two functions that are present in the different function entities of an E-UTRAN and an EPC is called a reference point. Table 1 below defines reference points illustrated in FIG. 1. In addition to the reference points illustrated in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point may be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points illustrated in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram illustrating the architecture of a common E-UTRAN and a common EPC.

As illustrated in FIG. 2, the eNodeB 20 may perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC may perform functions, such as the generation of paging, the management of an LTE IDLE state, the ciphering of a user plane, control of an EPS bearer, the ciphering of NAS signaling, and integrity protection.

FIG. 3 is an exemplary diagram illustrating the structure of a radio interface protocol in a control plane between UE and an eNodeB, and FIG. 4 is another exemplary diagram illustrating the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane illustrated in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side may be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH may carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs may be transmitted within the control region, and UE may monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI may include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section may be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN may check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE may configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer illustrated in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE may use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble may be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b illustrates an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

The idle UE 10, when attempting to establish an RRC connection, e.g., for attempting to call or transmit data or responding to paging from eNodeB 20, sends an RRC connection request message to eNodeB 20.

When receiving the RRC connection message from UE 10, eNodeB 20 accepts the RRC connection request from UE 10 if there are enough radio resources, and eNodeB 20 sends a response message, RRC connection setup message, to UE 10.

When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

In recent years, research into communication between devices or between a device and a server, without human interaction, i.e., machine type communication (MTC), has been actively conducted.

MTC is also called Internet of things (IoT) communication because there is no human intervention. Performing IoT communication based on cellular rather than wireless LAN like Wi-Fi is called CIoT. Unlike wireless LAN, CIoT supports even communication not based on an IP, as well as IP-based communication.

Meanwhile, in order to support a CIoT service, the 3GPP has improved a physical layer, i.e., radio access technology (RAT). The improved RAT is called narrowband (NB)-IoT.

Thus, a CIoT device using NB-IoT is expected to transmit and receive a small amount of data. However, in order for the CIoT device to transmit and receive data, it must transmit and receive a considerable amount of signals to and from a base station in advance. Transmission and reception of a large amount of control signals in advance to transmit/receive such a small amount of data may be inefficient.

To solve these problems, there have been attempts to optimize using a control plane and to optimize using a user plane in an evolved packet service (EPS) for CIoT.

However, in case where the CIoT device supports both or only any one of the optimization solution using the control plane and the optimization solution using the user plane, it is unclear how the base station should handle it.

SUMMARY OF THE INVENTION

Accordingly, an object of the present invention is to present a method that may solve the aforementioned problem.

To achieve the foregoing purposes, the disclosure of the present specification proposes a method for transmitting a non-access stratum (NAS) signaling request message. The method may performed by a wireless device and comprise: transferring, by an NAS layer of the wireless device, the NAS signaling request message to an access stratum (AS) layer to transmit the NAS signaling request message to a network node. The NAS signaling request message may include an indication indicating at least one preferred or required optimization method among an optimization method of optimizing an evolved packet system (EPS) using a control plane (CP) and an optimization method of optimizing the EPS using a user plane (UP) for a cellular Internet of things (CIoT). The method may further comprise: receiving, by the NAS layer of the wireless device, from the AS layer, an NAS signaling accept message or an NAS signaling reject message from the network node, wherein when the at least one preferred or required optimization method is not supported by the network node, the NAS signaling accept message or the NAS signaling reject message further includes a cause field.

When the NAS signaling accept message is received, the cause field may indicate that an optimization method not preferred by the CIoT device is used.

When the NAS signaling reject message is received, the cause field may indicate that any optimization method is not supported by a network.

When the NAS signaling reject message is received, the cause field may indicate that the optimization method required by the CIoT device is not supported by a network.

The NAS signaling request message may include at least one of an attach request message, a tracking area update (TAU) request message, and a routing area update (RAU) request message. The NAS signaling accept message may include at least one of an attach accept message, a TAU accept message, and an RAU accept message. The NAS signaling reject message may include at least one of an attach reject message, a TAU reject message, and an RAU reject message.

To achieve the foregoing purposes, the disclosure of the present specification proposes a wireless device transmitting a non-access stratum (NAS) signaling request message. The wireless device may comprise: a transceiver; and a processor controlling the transceiver and including an access stratum (AS) layer and an NAS layer. The NAS layer of the processor may transfer an NAS signaling request message to the AS layer to transmit the NAS signaling request message to a network node. The NAS signaling request message may include an indication indicating at least one preferred or required optimization method among an optimization method of optimizing an evolved packet system (EPS) using a control plane (CP) and an optimization method of optimizing the EPS using a user plane (UP) for a cellular Internet of things (CIoT). The NAS layer of the processor may receive, from the AS layer, an NAS signaling accept message or an NAS signaling reject message from the network node. When the at least one preferred or required optimization method is not supported by the network node, the NAS signaling accept message or the NAS signaling reject message further includes a cause field.

According to the present disclosure, the aforementioned problems of the related art may be solved.

BRIEF DESCRIPTION OF THE DRAWINGS

FIG. 7C illustrates a procedure in which a CIoT device transmits data according to a user plane (UP) CIoT EPS optimization.

Figure 1:
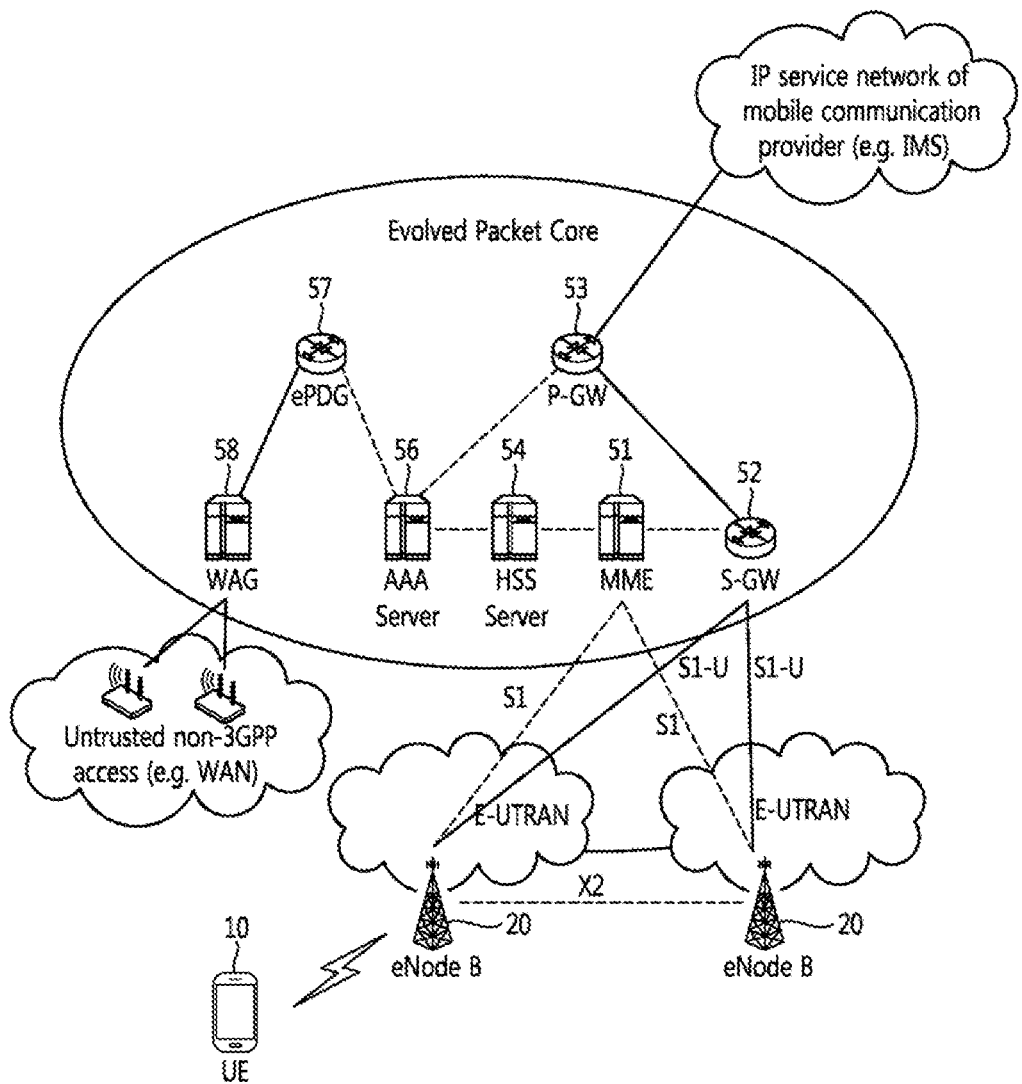
FIG. 1 is a structural diagram of an evolved mobile communication network.
Figure 2:
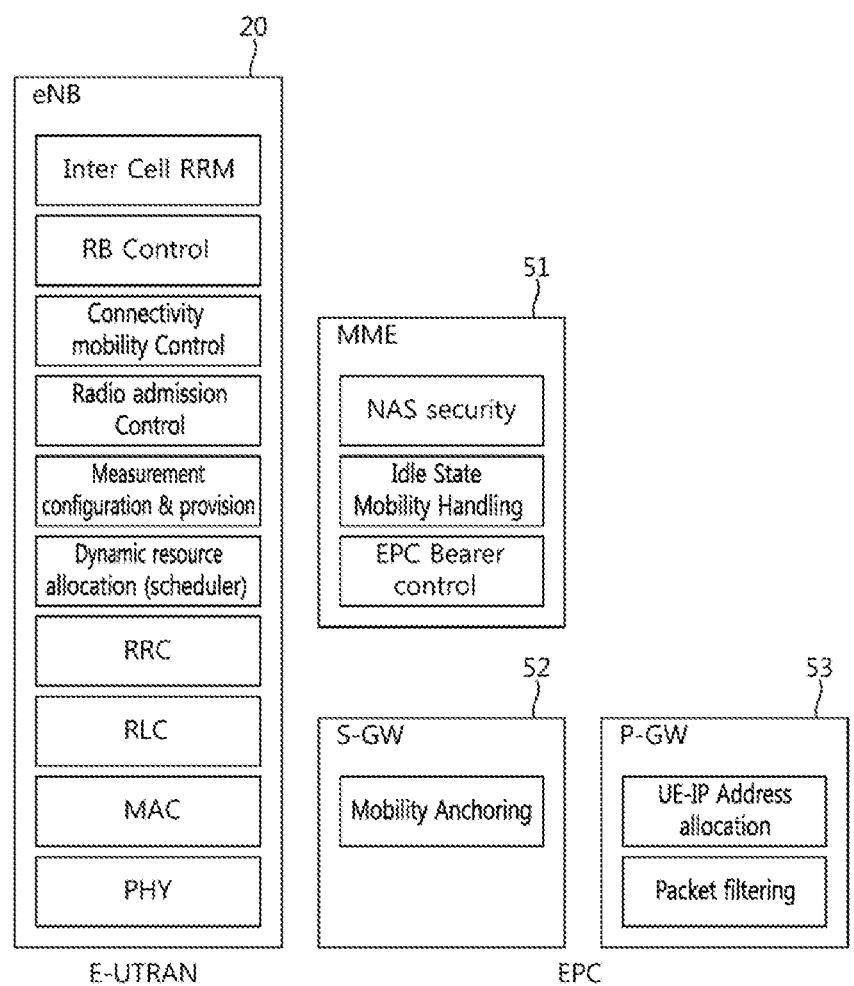
FIG. 2 is an exemplary diagram illustrating architectures of a general E-UTRAN and a general EPC.
Figure 3:
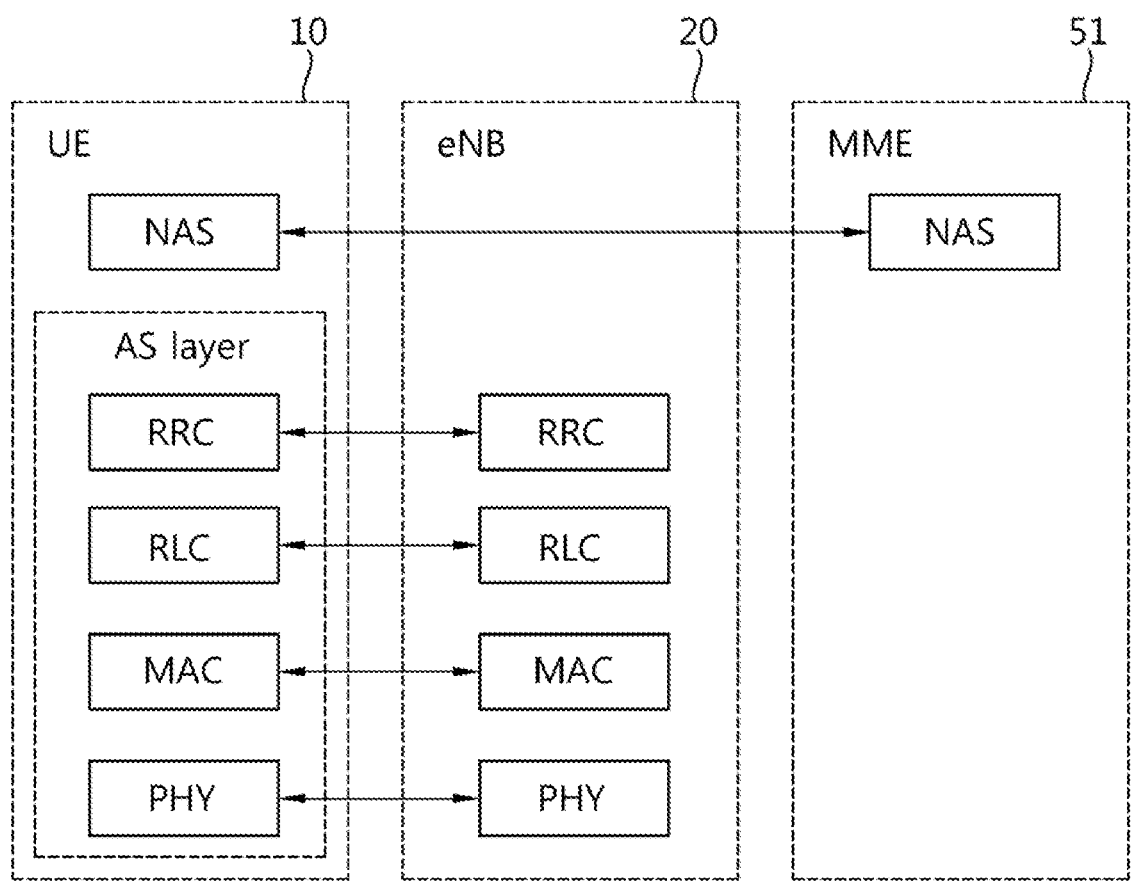
FIG. 3 is an exemplary diagram illustrating a structure of a radio interface protocol on a control plane between UE and eNodeB.
Figure 4:
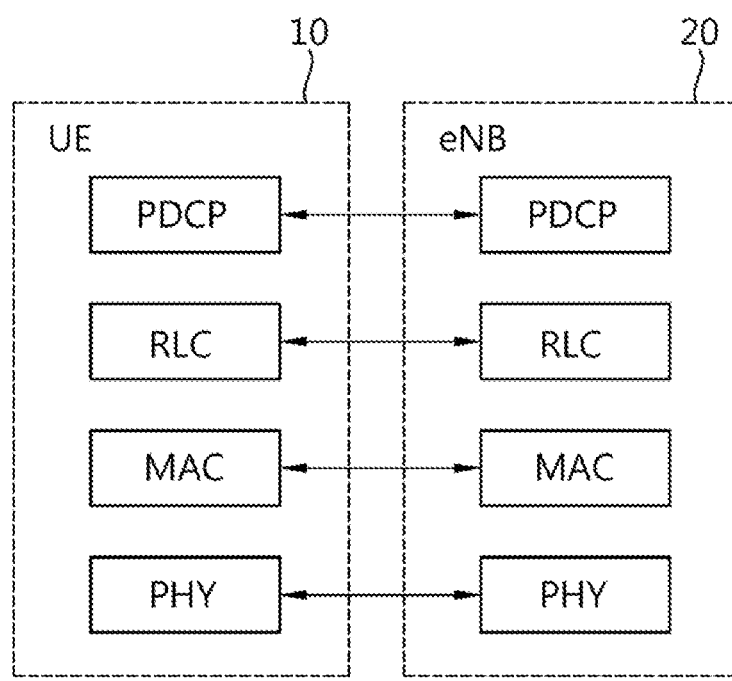
FIG. 4 is another exemplary diagram illustrating a structure of a radio interface protocol on a user plane between the UE and a base station.
Figure 5A:
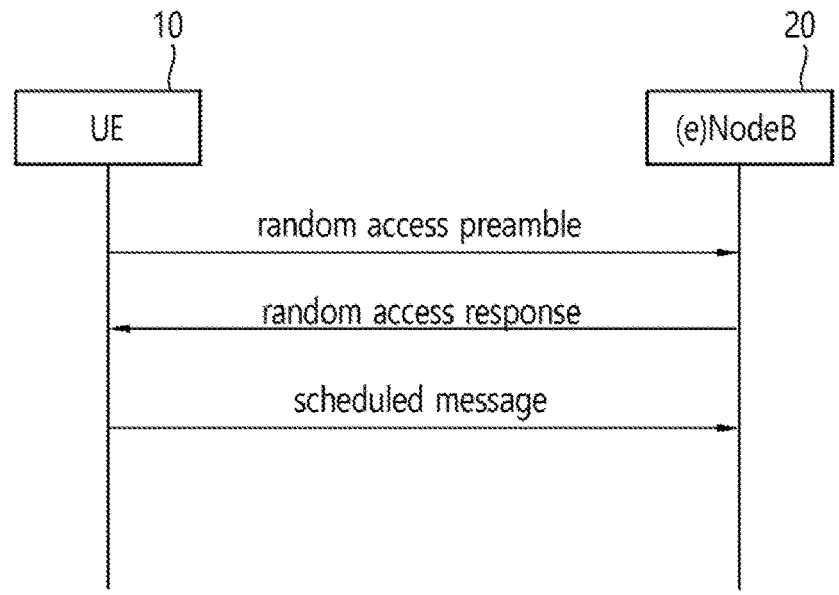
FIG. 5a is a flowchart illustrating a random access process in 3GPP LTE.
Figure 5B:
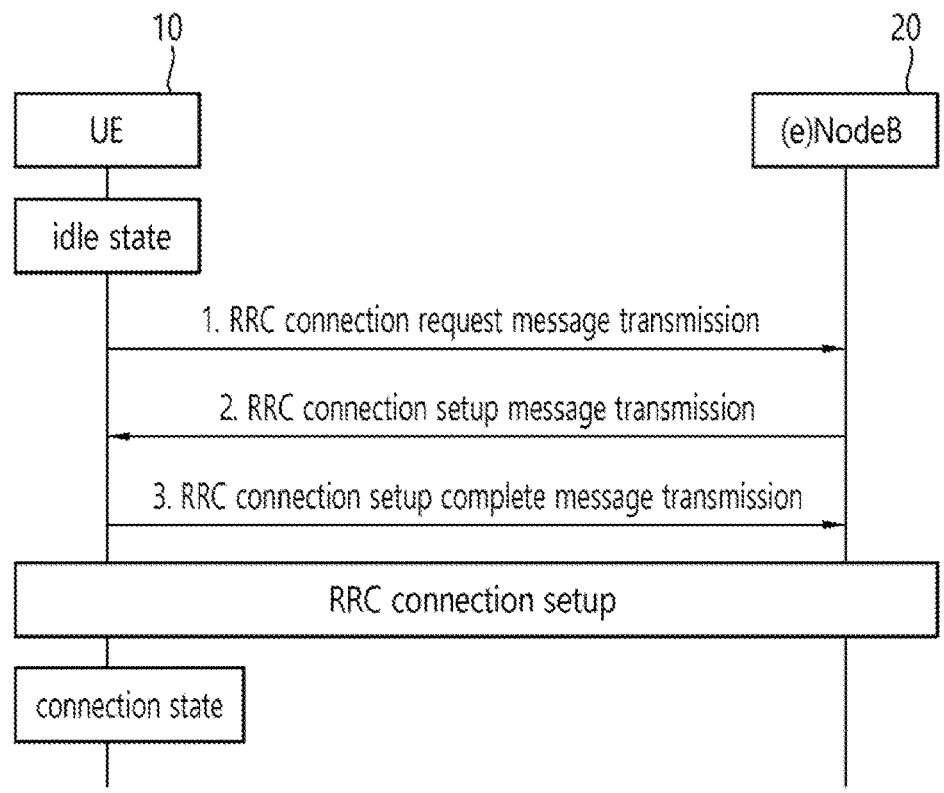
FIG. 5b illustrates a connection process in a radio resource control (RRC) layer.

DESCRIPTION OF EXEMPLARY
EMBODIMENTS

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is illustrated in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW may be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session may be formed.

UE context is information about the situation of UE which is used to manage the UE in a network, that is, situation information including an UE ID, mobility (e.g., a current location), and the attributes of a session (e.g., QoS and priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality NAS (Non-Access-Stratum): A higher stratum of a control plane between a UE and an MME. The NAS supports mobility management, session management, IP address management, etc., between the UE and the network.

MM (Mobility Management) operation/procedure: An operation or procedure for mobility regulation/management/control of the UE. The MM operation/procedure may be interpreted as including one or more of an MM operation/procedure in a CS network, a GMM operation/procedure in a GPRS network, and an EMM operation/procedure in an EPS network. The UE and the network node (e.g., MME, SGSN, and MSC) exchange an MM message to perform the MM operation/procedure.

SM (Session Management) operation/procedure: An operation or procedure for regulating/managing/processing/handling a user plane and/or a bearer context/PDP context of the UE. The SM operation/procedure may be interpreted as including one or more of an SM operation/procedure in a GPRS network and an ESM operation/procedure in an EPS network. The UE and the network node (e.g., MME and SGSN) exchange an SM message to perform the SM operation/procedure.

PLMN: as an abbreviation of Public Land Mobile Network, means a network identification number of a mobile communication provider. In roaming case of the UE, the PLMN is classified into a home PLMN (HPLMN) and a visited PLMN (VPLMN).

CIoT: An abbreviation of Cellular Internet of Things, and means performing based on IoT communication.

Narrowband-IoT: It refers to radio access technology (RAT) improved in 3GPP for CIoT. That is, it is a network operating at a bandwidth of up to 180 kHz (corresponding to one PRB).

Control plane CIoT EPS optimization: A signaling optimization on a control plane that enables efficient transmission of user data (user data based on IP or non-IP or SMS)

User plane CIoT EPS optimization: A signaling optimization on a user plane that enables efficient transmission of user data (user data based on IP or non-IP or SMS)

UE supporting CIoT EPS optimization: A UE that supports Control plane CIoT EPS optimization or User plane CIoT EPS optimization and one or more other CIoT EPS optimizations NB-S1 mode: This means a mode operating as an improved RAT (radio access technology) for NB (Narrowband) IoT WB-S1 mode: This means a mode operating as a normal RAT, not an improved RAT for NB IoT Hereinafter, an aspect of the present disclosure is described with reference to the accompanying drawings.

<Machine Type Communication (MTC) Communication>

The Machine Type Communication (MTC) means a communication established between a machine and a machine, in which a person is excluded, and the device used in this case is referred to an MTC device. The service provided through an MTC device is discriminated from the communication service in which a person intervenes, and may be applied to various ranges of services.

Figure 6:
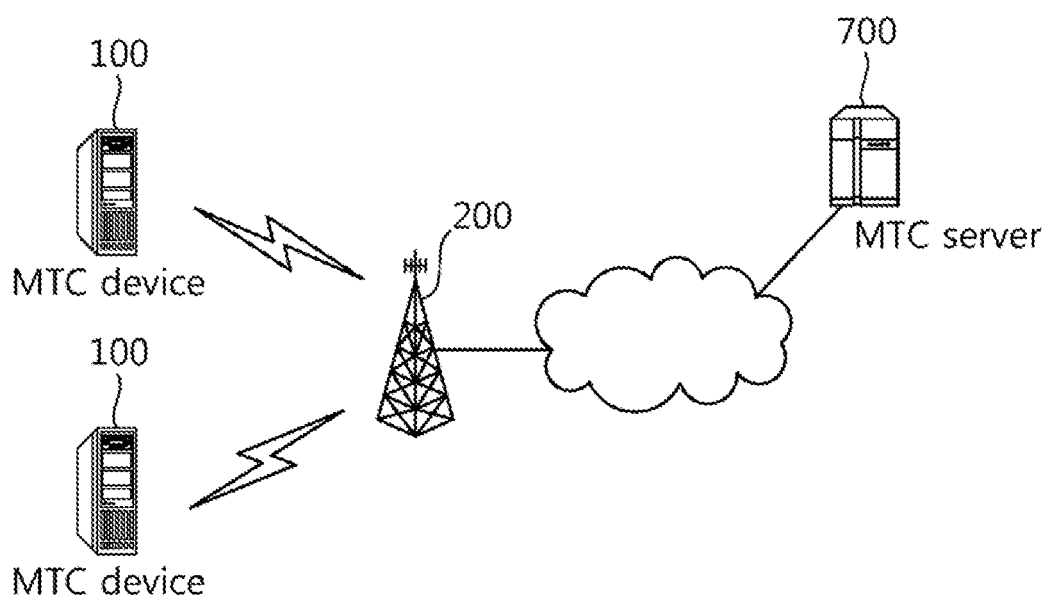
FIG. 6 illustrates an example of machine type communication (MTC).

FIG. 6 illustrates an example of the Machine Type communication (MTC) communication.

The Machine Type Communication (MTC) is referred to information interchange between MTC devices 100 through an eNodeB 200 in which human interaction is not accompanied or information interchange between an MTC device and an MTC server 700 through an eNodeB.

The MTC server 700 is an entity that communicates with an MTC device 100. The MTC server 700 executes an MTC application and provides a MTC-specific service to the MTC device.

The MTC device 100 is a wireless device that provides an MTC communication, and may be fixed or mobile.

<Cellular Internet of Things (CIoT) Communication>

The MTC communication is also called Internet of Things (IoT) communication since there is no intervention of a person. The IoT communication performed based on cellular, not Wireless LAN like Wi-Fi, is called CIoT. The CIoT supports a communication not based on IP as well as a communication based on IP, which is different from Wireless LAN.

Meanwhile, in order to support CIoT service, in 3GPP, a physical layer, that is, Radio Access Technology (RAT) has been improved. The improved RAT is called Narrowband-IoT (NB-IoT).

The RAT improved for the NB-IoT uses an optimized physical layer (e.g., carrier bandwidth is 180 kHz, and subcarrier spacing is 3.75 kHz or 15 kHz) for very low power consumption.

<Optimization for Data Transmission and Reception of CIoT Device>

Since a CIoT device transmits and receives a small amount of data, the CIoT device may operate in an improved RAT for NB-IoT, i.e., in a network operating at a bandwidth of up to 180 kHz (corresponding to one PRB).

However, although the CIoT device transmits/receives a small amount of data, since the CIoT device needs to exchange a lot of signaling with the network in advance, there is a problem of inefficiency. This will be described with reference to FIG. 7A.

Figure 7A:
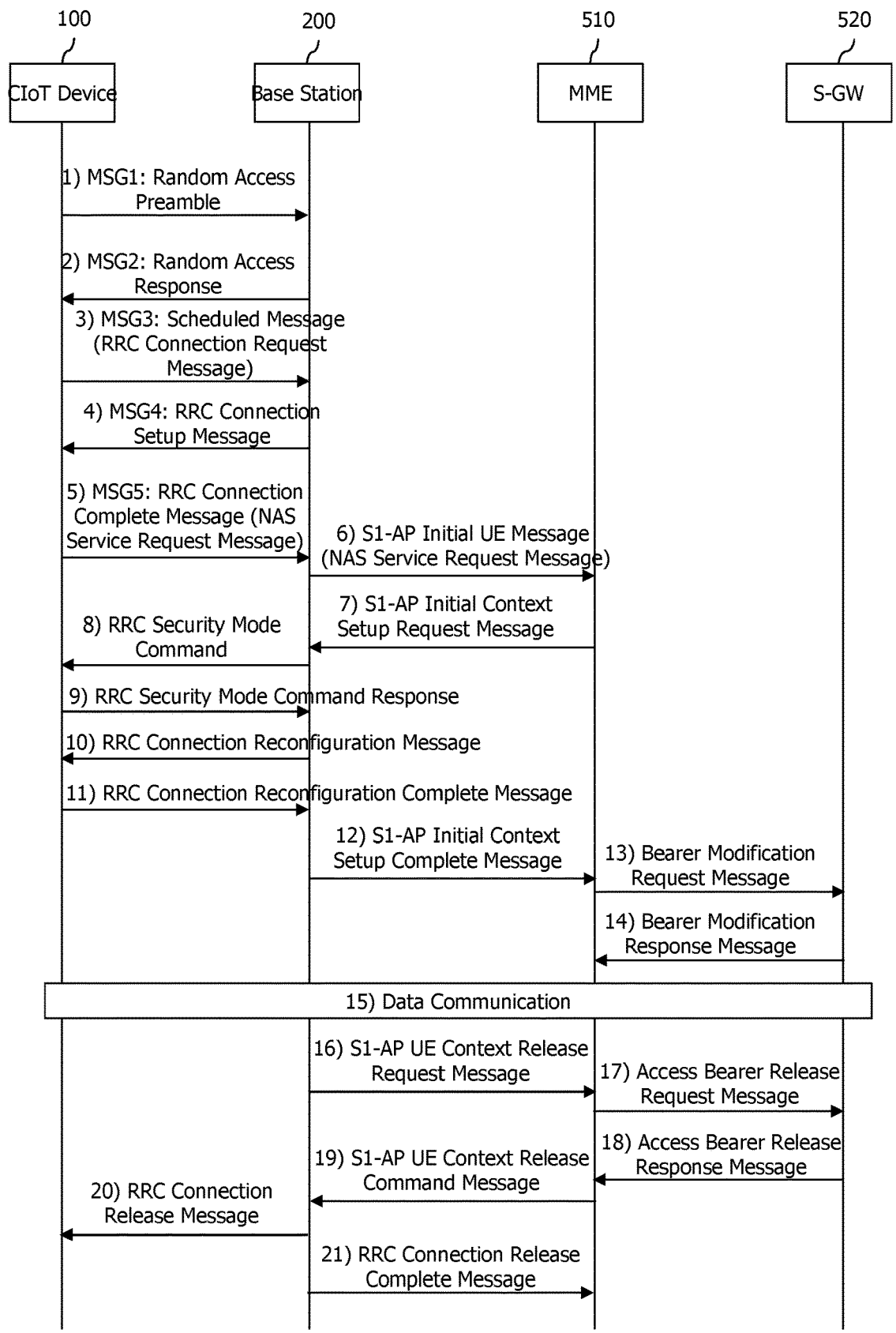
FIG. 7A illustrates a series of procedures performed by a CIoT device for data communication.

FIG. 7A illustrates a series of procedures performed by a CIoT device for data communication.

Hereinafter, a description will be given with reference to FIG. 7A in the following order.

1~5) First, the CIoT device (i.e., an MTC device) 100 performs a random access procedure for data communication. That is, the CIoT device 100 transmits a first message MSG1, e.g., a random access preamble, to a base station (BS) 200. Then, the CIoT device 100 receives a second message MSG2, e.g., a random access response message, from the BS 200. Then, the CIoT device 100 transmits a third message MSG3, e.g., a scheduled message, to the BS 200. The scheduled message may include an RRC connection request message. Thereafter, the CIoT device 100 receives a fourth message MSG4, e.g., an RRC connection setup message, from the BS 200. Then, the CIoT device 100 transmits a fifth message MSG5, e.g., an RRC connection complete message, to the BS 200. The RRC connection complete message may include a NAS service request message 6~7) Then, the BS 200 transmits an S1-AP-based initial UE message to an MME 510. The initial UE message may include the NAS service request message. The MME 510 transmits an S1-AP-based initial context setup request message to the BS.

8~9) Then, the BS 200 transmits an RRC security mode command (SMC) to the CIoT device and receives an RRC security mode command response.

10~11) Thereafter, the BS 200 transmits an RRC connection reconfiguration message to the CIoT 100, and the CIoT 100 transmits an RRC connection reconfiguration complete message to the BS.

12~14) The BS 200 transmits an S1-AP-based initial context setup complete message to the MME 510. Then, the MME 510 transmits a bearer modify request message to an S-GW 520 and receives a bearer modify response message from the S-GW 520.

15) As a result, the CIoT device 100 may perform data communication

16~19) Meanwhile, when the data communication is completed and the RRC connection is not required, the BS 200 transmits an S1-AP-based UE context release request message to the MME 510. Then, the MME 510 transmits an access bearer release request message to the S-GW 520. Then, the S-GW 510 transfers an access bearer release response message to the MME 510. The MME 510 transmits an S1-AP-based UE context release command message to the BS.

20) The BS 200 transmits an RRC connection release message to the UE and transmits an RRC connection release complete message to the MME 510.

As described above, although the CIoT device 100 transmits/receives a small amount of data, since the CIoT device 100 must exchange a large number of signals with the BS 200, there is a problem of inefficiency.

In particular, the CIoT devices are expected to be located with significantly high density within coverage of the BS, and in this situation, a significantly large number of signals may cause the network to be overloaded.

Therefore, to solve the problem, there have been attempts to optimize using a control plane and to optimize using a user plane in an evolved packet service (EPS) for CIoT, which will be described hereinafter.

1. Control Plane (CP) CIoT EPS Optimization

This is a method of transmitting data by including the data in a packet data unit (PDU) of a NAS layer. It is a method of transmitting data through a control plane (SRB+S1-AP) for transmitting a NAS message such as Attach, Tracking Area Update (TAU), and the like, of the NAS layer, without using the existing user plane setup (DRB+S1-U path) required for data transmission. To this end, an S11-U path is newly defined between the MME and the S-GW.

Data may be transmitted via the newly defined S11-U path. Here, for security of the data, security of the NAS layer, instead of security of the AS layer, is used. As described above, since security of the AS layer is unnecessary, a security mode command (SMC) procedure, or the like, may be omitted. Also, required RRC signaling is reduced even when switching the RRC connection mode.

This will be described with reference to FIG. 7B.

Figure 7B:
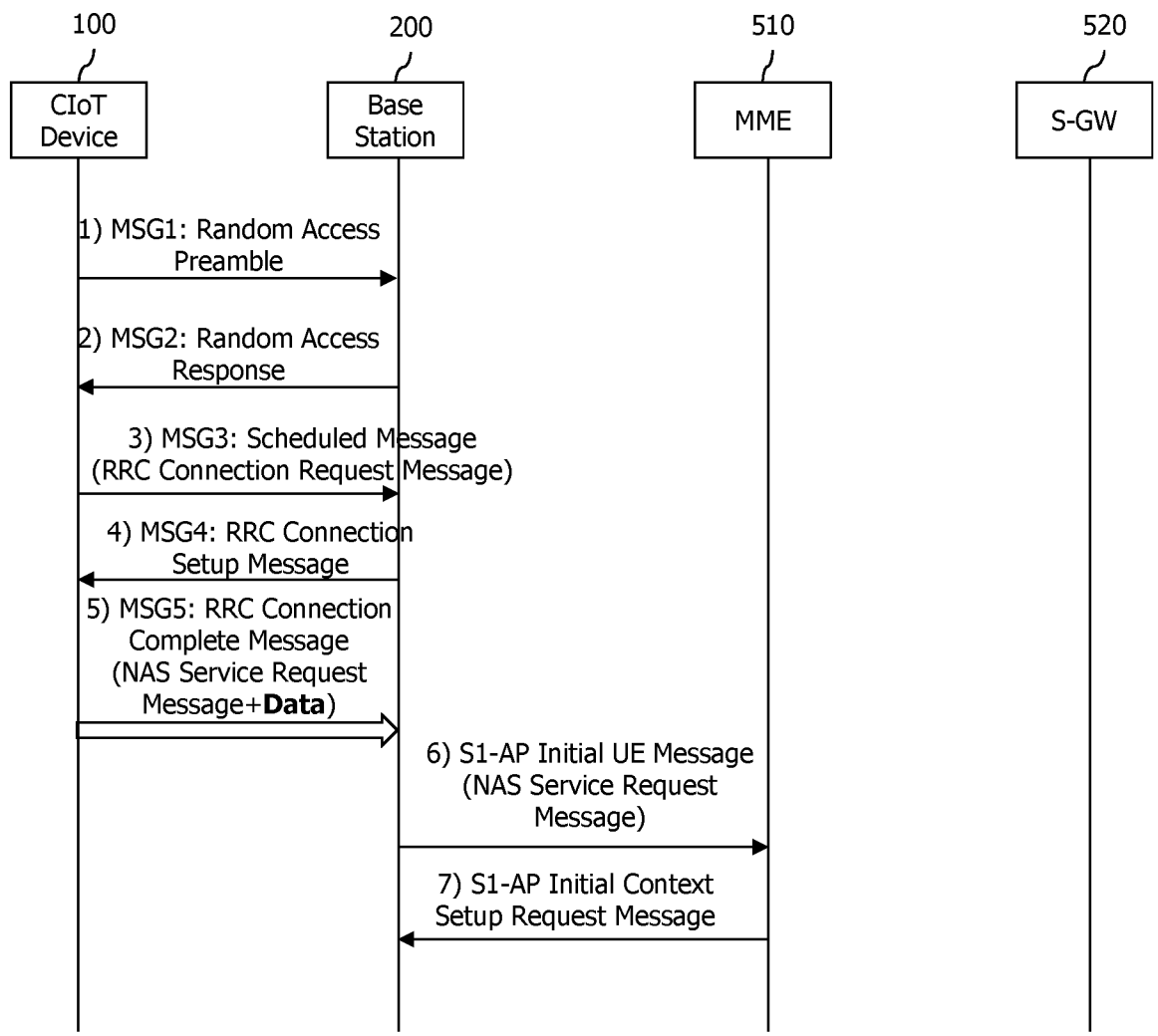
FIG. 7B illustrates a procedure in which a CIoT device transmits data according to control plane (CP) CIoT EPS optimization.

FIG. 7B illustrates a procedure in which the CIoT device transmits data according to control plane (CP) CIoT EPS optimization.

As illustrated in FIG. 7B, the CIoT device 100 may transmit data in a NAS service request message included in a fifth message MSG 5, e.g., an RRC connection complete message.

That is, when FIGS. 7A and 7B are compared, in FIG. 7A, the CIoT device 100 is inefficient because it can transmit data in the fifteenth step. However, in FIG. 7B, the CIoT device 100 can transmit data in the fifth step, and thus, it is improved to be efficient.

2. User Plane (UP) CIoT EPS Optimization

If there is no data transmission and reception, UE context (i.e., a UE ID, AS security information, etc.) stored in the CIoT device and the BS are maintained, rather than being canceled (deleted). Also, if there is no data transmission and reception, the CIoT device performs an RRC connection suspend procedure, rather than performing an S1 release procedure. Therefore, when the CIoT device requests RRC connection again, it may quickly switch from an RRC idle mode to an RRC connection mode. That is, the CIoT performs an RRC connection resume procedure, rather than a service request procedure, for setting up a user plane. Therefore, the number of RRC signals that the CIoT device should transmit and receive to switch from the RRC idle mode (EMM-IDLE) to the RRC connection mode (EMM-CONNECTED) is significantly reduced.

FIG. 7C illustrates a procedure in which the CIoT device transmits data according to user plane (UP) CIoT EPS optimization.

0) First, if there is no data transmission/reception, the UE context stored in the CIoT device 100 and the BS 200 is maintained, rather than being canceled (deleted) and the RRC connection suspend procedure, rather than the S1 release procedure, is performed.

1~2) Thereafter, if data communication is required again, the CIoT device 100 transmits a first message, e.g., a random access preamble, to the BS 200. Then, the CIoT device 100 receives a second message, e.g., a random access response, from the BS 200.

3) Then, the CIoT device 100 transmits an RRC connection resume request message in a third message, e.g., a scheduled message. Here, a resume ID is included in the RRC connection resume request message.

4~5) The BS 200 transmits a fourth message, e.g., an RRC connection resume complete message, to the CIoT device 100. Here, the RRC connection resume complete message includes a resume ID and a bearer descriptor. Then, the CIoT device 100 transmits a fifth message, e.g., an RRC connection resume complete message, to the BS 200. The RRC connection resume complete message also includes the resume ID.

6) The BS 200 transmits an S1-AP-based UE context activation request message to the MME 510.

7~9) The MME 510 transmits a bearer modify request message to the S-GW 520 and receives a bearer modify response message from the S-GW 520. Then, the MME 510 transmits a UE context activation response message to the BS 200.

10) As a result, the CIoT device 100 may perform data communication.

When FIGS. 7A and 7C are compared, in FIG. 7A, the CIoT device 100 is inefficient because it can transmit data in the fifteenth step. However, in FIG. 7C, the CIoT device 100 can transmit data in the tenth step, and thus, it is improved to be efficient.

<Description of the Present Disclosure>

As discussed above, although the CIoT device transmits/receives a small amount of data, since the CIoT device needs to exchange a lot of signaling with the network in advance, there is a problem of inefficiency. To solve this problem, control plane (CP) CIoT EPS optimization and user plane (UP) CIoT EPS optimization are proposed.

However, when the CIoT device supports both or any one of the control plane (CP) CIoT EPS optimization and the user plane (UP) CIoT EPS optimization, it is also unclear how the BS must handle it. More specifically, when the CIoT device supports both or only any one of them, it is unclear which MME the BS should select from among several MMEs. Therefore, when the CIoT device wants to provide a mobile originating (MO) service (e.g., call origination, data origination, or signaling origination), the BS cannot perform efficient selection and consequently wastes network resources and a user experience may deteriorate.

Accordingly, the present disclosure proposes proposals for solving the above-mentioned problems.

I. Proposal 1 of the Present Disclosure

I-1. Proposal 1-1 of the Present Disclosure

According to proposal 1-1 of the present disclosure, the NAS layer of the CIoT device includes indication/information indicating a preferred optimization solution in a NAS signal request (e.g., an attach request, a TAU/RAU request, a service request, an attach request without a PDN connection request, a service request including data) and provides the same to the AS layer of the CIoT device. The indication/information may indicate that control plane (CP) CIoT EPS optimization is preferred or user plane (UP) CIoT EPS optimization is preferred. This will be described in detail with reference to FIG. 8.

Figure 8:
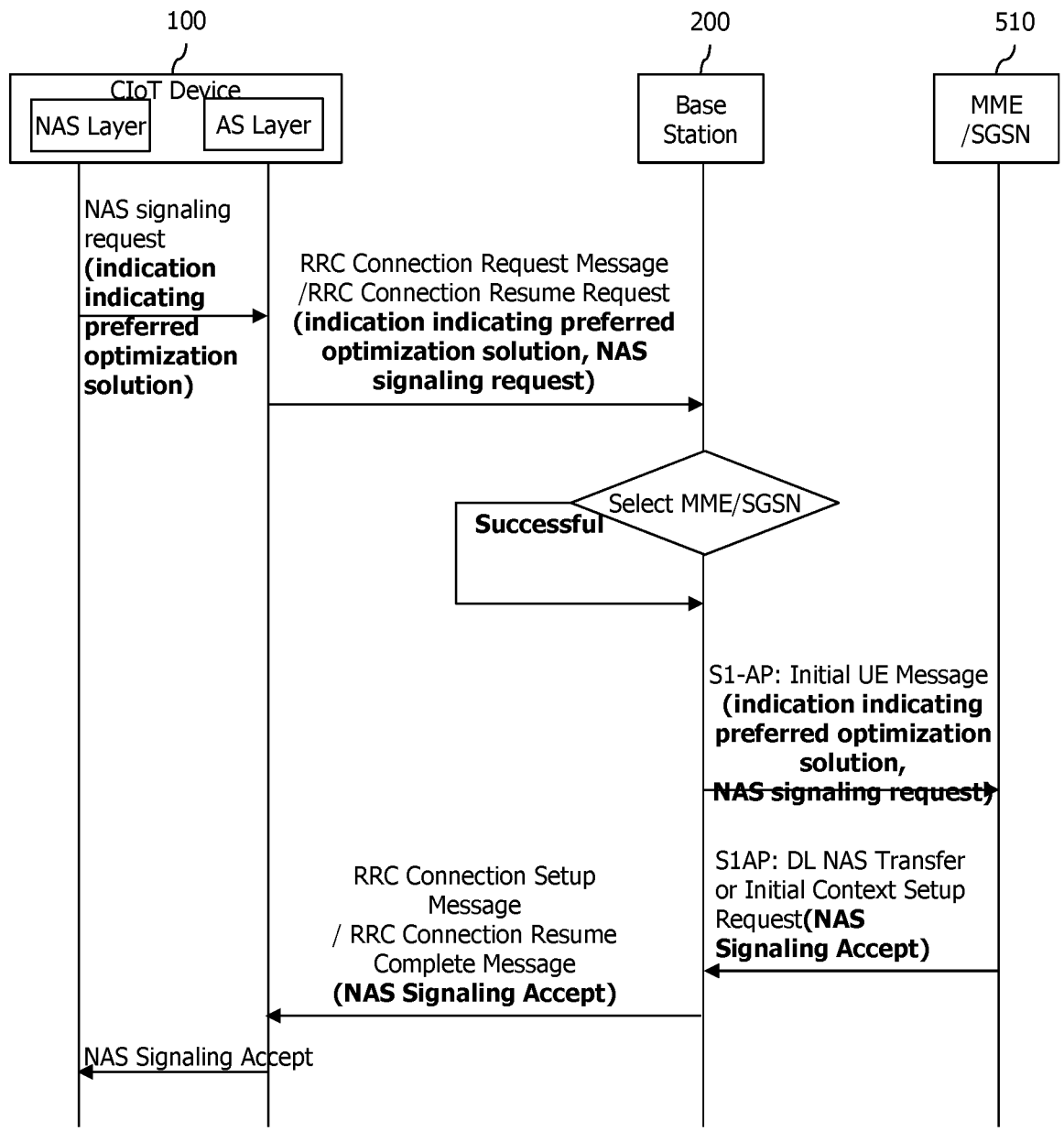
FIG. 8 is a signal flowchart illustrating proposal 1-1 of the present disclosure.

FIG. 8 is a signal flowchart illustrating proposal 1-1 of the present disclosure.

First, as described above, the NAS layer of the CIoT device includes the indications/information indicating a preferred optimization solution in the NAS signal request and provides the same to the AS layer of the CIoT device.

Then, the AS layer of the CIoT device includes the indication/information and the NAS signaling request in an RRC connection request message (or an RRC connection setup complete message) or an RRC connection resume request message (or an RRC connection resume complete message) a transmit the same to the BS.

The BS then selects a network node (e.g., MME/SGSN) supporting control plane (CP) CIoT EPS optimization of a network node, (e.g., MME/SGSN) supporting the user plane (UP) CIoT EPS optimization on the basis of the indication/information regarding the preference of the CIoT.

Then, the BS transmits an S1-AP-based initial UE message to the selected network node (e.g., MME/SGSN). The initial UE message may include indication/information indicating the preferred optimization solution and the NAS signaling request.

Then, the network node (e.g., MME/SGSN) transfers a DL NAS transfer message or an initial context setup request message including NAS signaling accept (e.g., admittance accept, TAU/RAU accept, service request accept) to the BS.

Also, when the selection is successful, the BS transmits an RRC connection setup message or an RRC connection resume complete message to the CIoT device.

Meanwhile, if the BS is unsuccessful in selecting a network node (e.g., MME/SGSN) supporting the preferred optimization solution of the CIoT device, the BS selects a network node (e.g., MME/SGSN) supporting an optimization solution not preferred by the CIoT device as a second best plan. Also, the BS transmits an RRC connection setup message or an RRC connection resume complete message to the AS layer of the CIoT device. Here, the BS includes a specific cause field in the message. The specific cause field may indicate that the optimization solution not preferred by the CIoT device is used. The AS layer of the CIoT device then transfers the cause field to the NAS layer. The transfer may be performed through a response with respect to the NAS signal request. The NAS layer of the CIoT device checks the cause field received from the AS layer and uses an optimization solution supported by the network although the optimization solution is not a preferred optimization solution.

However, if the BS does not succeed in selecting the network node (e.g., MME/SGSN) supporting the optimization solution preferred by the CIoT device and if the BS does not succeed in selecting the network node (e.g., MME/SGSN) supporting the optimization solution not preferred by the CIoT device, the BS transmits an RRC connection reject message or an RRC connection resume reject message to the AS layer of the CIoT device. Here, the BS may include a specific cause field in the message. The specific cause field may indicate that no CIoT EPS optimization solution is supported. Then, the AS layer of the CIoT device transfers the cause field or what the cause field means to the NAS layer. Then, the NAS layer of the CIoT device may recognize that a PLMN does not currently support the CIoT EPS optimization and re-attempts the NAS signaling request procedure by a predetermined maximum number of re-attempt, or regard that the predetermined maximum number of re-attempt has reached, and perform another PLMN selection procedure to select a PLMN that supports CIoT EPS optimization.

I-2. Proposal 1-2 of Present Disclosure

According to proposal 1-2 of the present disclosure, the NAS layer of the CIoT device includes an indication/information indicating strongly/requested optimization solution in a NAS signal request (e.g., attach request, TAU/RAU request, service request, attach request without a PDN connection request, and a service request including data) and provides the same to the AS layer of the CIoT. The indication/information may indicate that the control plane (CP) CIoT EPS optimization is strong/required or that the user plane (UP) CIoT EPS optimization is strong/required. This will be described in detail with reference to FIG. 9.

Figure 9:
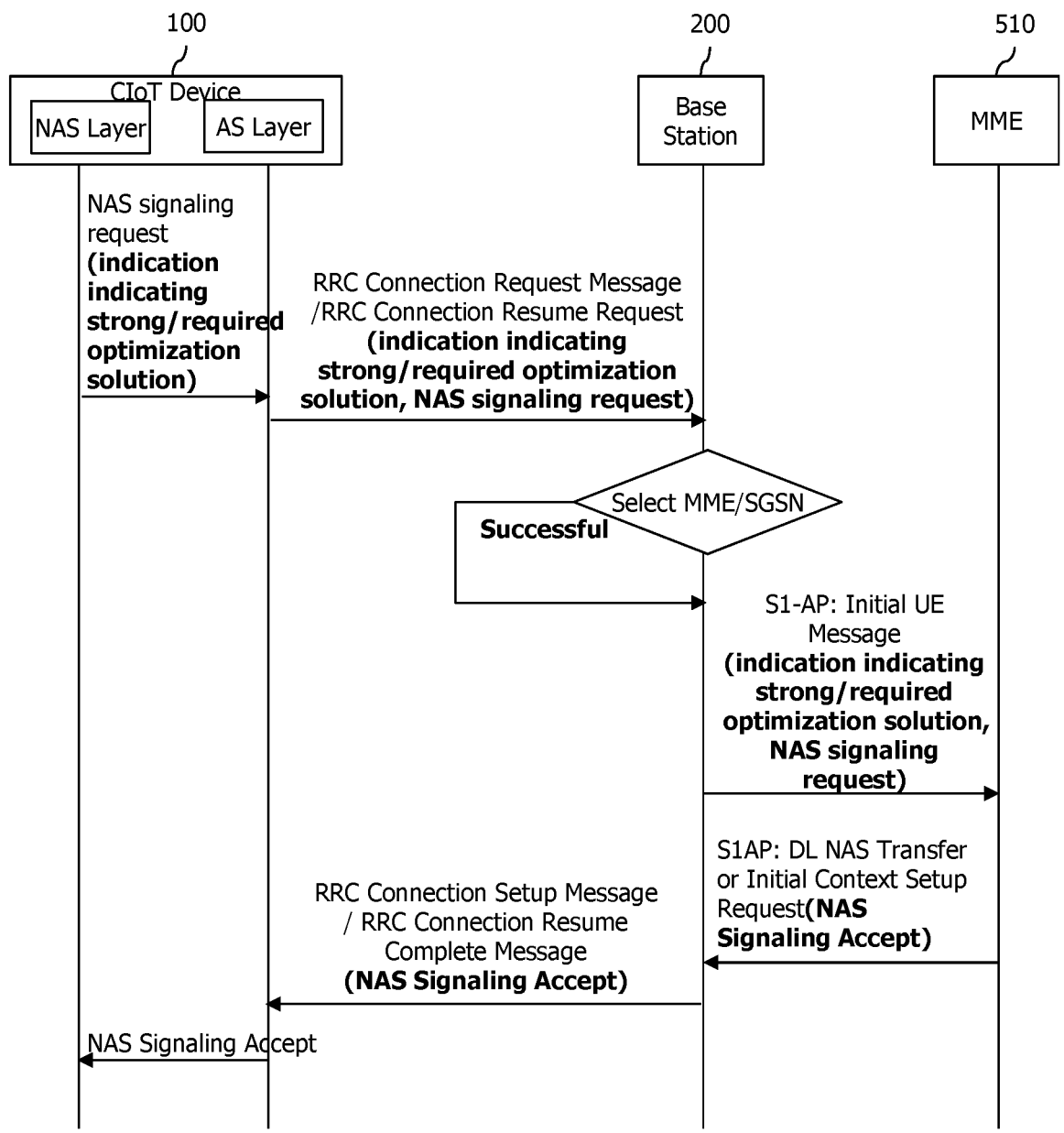
FIG. 9 is a signal flowchart illustrating proposal 1-2 of the present disclosure.

FIG. 9 is a signal flowchart illustrating proposal 1-2 of the present disclosure.

First, as described above, the NAS layer of the CIoT device includes indications/information indicating a strong/required optimization solution in the NAS signal request and provides it to the AS layer of the CIoT device.

Then, the AS layer of the CIoT device includes the indication/information and the NAS signaling request in the RRC connection request message (or the RRC connection setup complete message) or the RRC connection resume request message (or the RRC connection resume complete message) and transmits it to the BS. Here, the strongly/requiring means that the optimization solution desired by the CIoT device must be used. Therefore, the BS must select a network node (e.g., MME/SGSN) that supports the optimization solution strong/required by the CIoT device.

The BS then selects a network node (e.g., MME/SGSN) that supports control plane (CP) CIoT EPS optimization or a network node (e.g., MME/SGSN) that supports user plane (UP) CIoT EPS optimization on the basis of the indication/information of the CIoT device.

If the selection is successful, the BS transmits an S1-AP-based initial UE message to the selected network node (e.g., MME/SGSN). The initial UE message may include indication/information indicating the strong/required optimization solution and the NAS signaling request.

Then, the network node (e.g., MME/SGSN) transfers a DL NAS transfer message or an initial context setup request message including NAS signaling accept (e.g., attach accept, TAU/RAU accept, service request accept) to the BS.

Also, if the selection is successful, the BS transmits an RRC connection setup message or an RRC connection restart complete message to the CIoT device.

However, if the BS is unsuccessful in selecting a network node (e.g., MME/SGSN) that supports the optimization solution strong/required by the CIoT device, the BS transmits an RRC connection reject message or an RRC connection resume rejection message to the AS layer of the CIoT device. Here, the BS may include a specific cause field in the message. The specific cause field may indicate that the CIoT EPS optimization solution strong/required by the CIoT device is not supported. Then, the AS layer of the CIoT device transfers the cause field or what the value in the cause field means to the NAS layer. The NAS layer then recognizes that the PLMN currently does not support CIoT EPS optimization and may retry the NAS signaling request procedure by a predetermined maximum retry number, or regard that the predetermined maximum retry number has been reached and perform another PLMN selection procedure to select a PLMN that supports CIoT EPS optimization.

II. Proposal 2 of Present Disclosure

II-1. Proposal 2-1 of Present Disclosure

Figure 10:
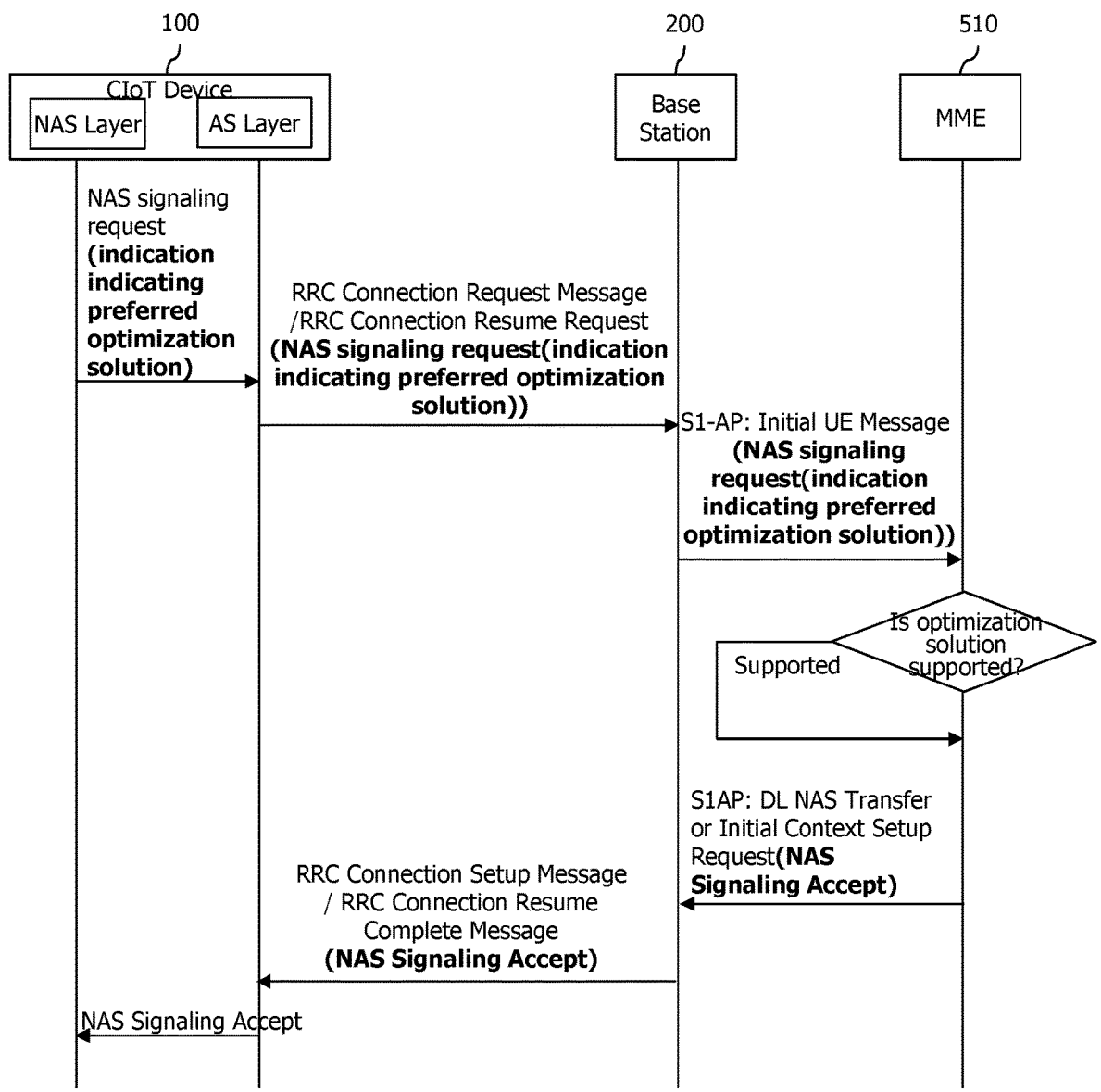
FIG. 10 is a signal flowchart illustrating proposal 2-1 of the present disclosure.

FIG. 10 is a signal flowchart illustrating proposal 2-1 of the present disclosure.

The NAS layer of the CIoT device includes indication/information indicating a preferred optimization solution in the NAS signal request and provides it to the AS layer of the CIoT device. The indication/information may indicate that control plane (CP) CIoT EPS optimization is preferred or user plane (UP) CIoT EPS optimization is preferred.

Then, the AS layer of the CIoT device may include the NAS signaling request in the RRC connection request message (or the RRC connection setup complete message) or the RRC connection resume request message (or the RRC connection resume complete message) and transmit the same to the BS. Here, the NAS signaling request includes the indication/information.

The BS then includes the NAS signaling request in an S1-AP-based initial UE message and transmits the same to the network node (e.g., MME/SGSN).

Upon receipt of the NAS signaling request, the network node (e.g., MME/SGSN) checks the indication/information.

If the network node (e.g., MME/SGSN) supports the optimization solution preferred by the CIoT device, the network node (e.g., MME/SGSN) transfers a DL NAS transfer message or an initial context setup request message including a NAS signaling accept message (e.g., attach accept, TAU/RAU accept, etc.) to the BS.

However, in case where the network node (e.g., MME/SGSN) does not support the optimization solution preferred by the CIoT device but supports another optimization solution not preferred by the CIoT device, the network node (e.g., MME/SGSN) may include a specific cause field in the NAS signaling accept message and transmit the same. The specific cause field may indicate that the optimization solution not preferred by the CIoT device is used. In this case, the NAS layer of the CIoT device checks the cause field and uses the optimization solution supported by the corresponding network node although the optimization solution is not the preferred optimization solution.

However, in case where the network node (e.g., MME/SGSN) does not support both the optimization solution preferred by the CIoT device and another optimization solution not preferred by the CIoT device, the network node transmits an NAS signaling reject (e.g., attach reject, TAU/RAU reject, service reject) message. Here, the reject message may include a specific cause field. The specific cause field may indicate that CIoT EPS optimization is not supported. Then, the NAS layer of the CIoT device may recognize that the PLMN does not currently support the CIoT EPS optimization and retry the NAS signaling request procedure by a predetermined maximum retry number or regard that the predetermined maximum retry number has been reached and perform another PLMN selection procedure to select a PLMN that supports CIoT EPS optimization.

As described above, the NAS layer of the CIoT device may include indications/information indicating the preferred optimization solution in a NAS request message as illustrated in the following table and transmit the same to the network (i.e., a BS).

TABLE 2

| Attach request message or TAU request message |
| Additional information update type value (octet 1) |
| Preferred CIoT EPS optimization solution |

| Bit | | |
|---|---|---|
| 4 | 3 | |
| 0 | 0 | Additional information is not present |
| 0 | 1 | Control plane (CP) CIoT EPS optimization |
| 1 | 0 | User plane (UP) CIoT EPS optimization |
| 1 | 1 | reserved |

TABLE 3

| Attach request message, TAU request message, or attach request message without PDN connection request |
| Preferred CIoT EPS optimization solution |

| Bit | | |
|---|---|---|
| 4 | 3 | |
| 0 | 0 | Additional information is not present |
| 0 | 1 | Control plane (CP) CIoT EPS optimization |
| 1 | 0 | User plane (UP) CIoT EPS optimization |
| 1 | 1 | reserved |

Meanwhile, in case where the network node (e.g., MME/SGSN) supports the preferred optimization solution on the basis of indication/information indicating the optimization solution preferred by the CIoT device included in the NAS request message, i.e., a bit, the corresponding network node (e.g., MME/SGSN) may transmit messages as illustrated in the following table to the CIoT.

TABLE 4

| Attach accept message or TAU accept message |
| Additional update result value (octet 1) |
| Control plane (CP) CIoT EPS optimization is accepted |
| 0    Control plane (CP) CIoT EPS optimization is not accepted |
| 1    Control plane (CP) CIoT EPS optimization is accepted |
| Or |
| User plane (UP) CIoT EPS optimization is accepted |
| 0    User plane (UP) CIoT EPS optimization is not accepted |
| 1    User plane (UP) CIoT EPS optimization is accepted |

TABLE 5

| Attach accept message, TAU accept message, or an attach accept message without PDN connection accept |
| Additional update result value (octet 1) |
| Control plane (CP) CIoT EPS optimization is accepted |
| 0    Control plane (CP) CIoT EPS optimization is not accepted |
| 1    Control plane (CP) CIoT EPS optimization is accepted |
| Or |
| User plane (UP) CIoT EPS optimization is accepted |
| 0    User plane (UP) CIoT EPS optimization is not accepted |
| 1    User plane (UP) CIoT EPS optimization is accepted |

Meanwhile, in case where the network node (e.g., MME/SGSN) does not support both the optimization solution preferred by the CIoT device and an optimization solution not preferred by the CIoT device, the following reject message may be transmitted to the CIoT device.

TABLE 6

| Attach reject message/TAU reject message/attach reject message without PDN connection reject |
| EMM cause |
| extended EMM cause |

The EMM cause or the extended EMM cause may be as shown in the following tables.

TABLE 7

| EMM cause | | | | | | | | |
|---|---|---|---|---|---|---|---|---|
| 0 | 1 | 1 | 1 | 1 | 1 | 1 | 1 | CIoT EPS optimization is not supported |

TABLE 8

Figure 11:
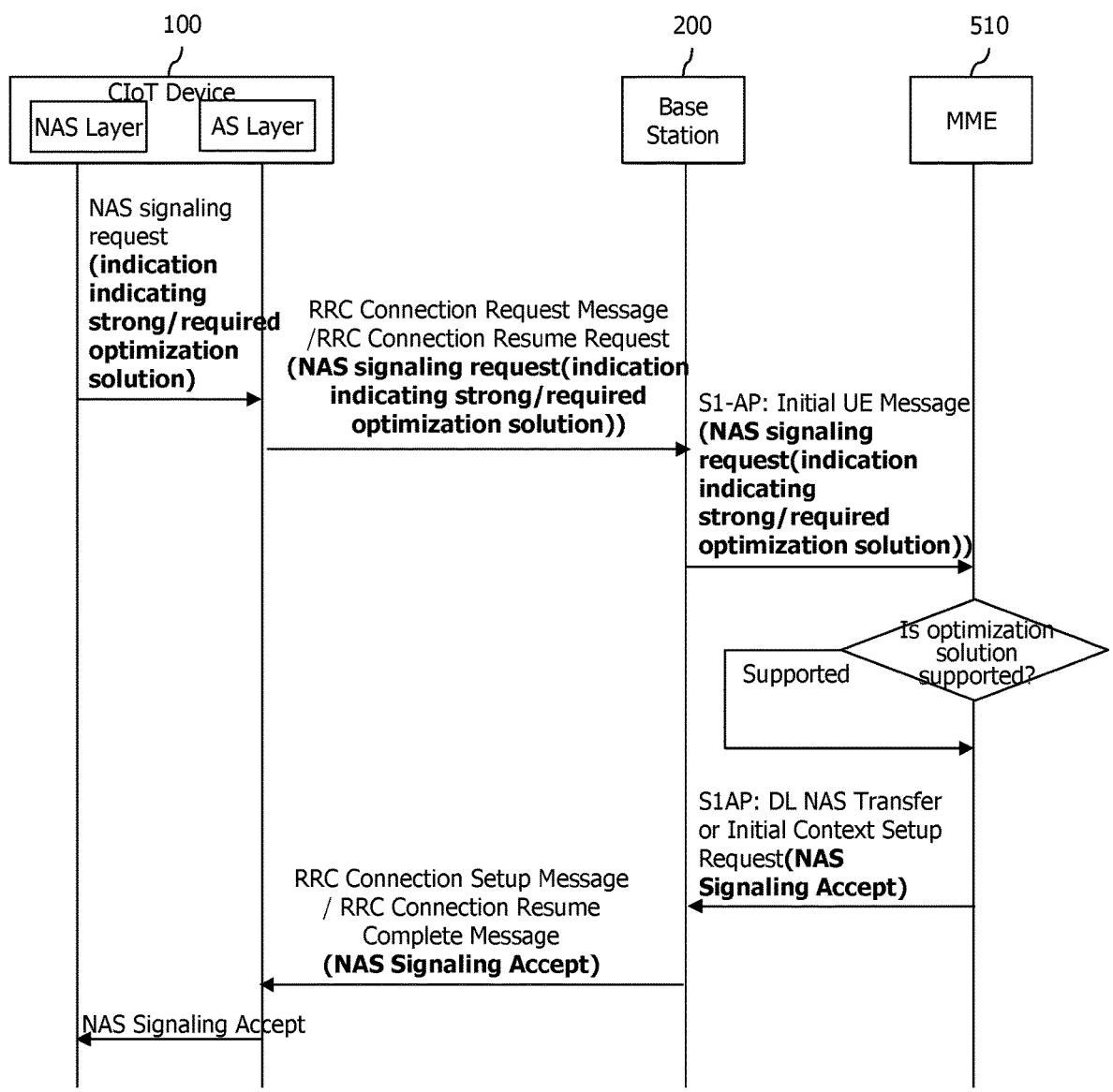
FIG. 11 is a signal flowchart illustrating proposal 2-2 of the present disclosure.

Extended EMM cause
Information regarding CIoT EPS optimization
Bit
2
0   CIoT EPS optimization information is not present
1   CIoT EPS optimization is not supported II-2. Proposal 2-2 of Present Disclosure FIG. 11 is a signal flowchart illustrating proposal 2-2 of the present disclosure.

The NAS layer of the CIoT device includes indications/information indicating a strong/required optimization solution in the NAS signal request and provides it to the AS layer of the CIoT device. Here, Here, the strongly/requiring means that the optimization solution desired by the CIoT device must be used. Therefore, the network node (e.g., MME/SGSN) that supports the optimization solution strong/required by the CIoT device must be selected.

Then, the AS layer of the CIoT device may include the NAS signaling request in the RRC connection request message (or the RRC connection setup complete message) or the RRC connection resume request message (or the RRC connection resume complete message) and transmit the same to the BS. Here, the NAS signaling request includes the indication/information.

The BS then includes the NAS signaling request in an S1-AP-based initial UE message and transmits the same to the network node (e.g., MME/SGSN). Here, the NAS signaling request includes the indication/information.

Upon receipt of the NAS signaling request, the network node (e.g., MME/SGSN) checks the indication/information.

If the network node (e.g., MME/SGSN) supports the optimization solution strong/required by the CIoT device, the network node (e.g., MME/SGSN) transfers a DL NAS transfer message including an NAS signaling accept message (e.g., attach accept, TAU/RAU accept, etc.) or an initial context setup request message to the BS.

However, if the network node (e.g., MME/SGSN) does not support the optimization solution strong/required by the CIoT device, the network node (e.g., MME/SGSN) transmits an NAS signaling reject message (e.g., attach reject, TAU/RAU reject, service reject). Here, a specific cause field may be included in the reject message. The specific cause field may indicate that CIoT EPS optimization is not supported. Then, the NAS layer of the CIoT device may recognize that the PLMN does not currently support the CIoT EPS optimization and retry the NAS signaling request procedure by a predetermined maximum retry number or regard that the predetermined maximum retry number has been reached and perform another PLMN selection procedure to select a PLMN that supports CIoT EPS optimization.

As described above, the NAS layer of the CIoT device may include indication/information indicating the strong/required optimization solution in the NAS request message as illustrated in the following table and transmit the same.

TABLE 9

Attach request message or TAU request message
Additional information update type value (octet 1)
Strong/required CIoT EPS optimization solution
Bit
4  3
0  0   Additional information is not present TABLE 9-continued 0  1   Control plane (CP) CIoT EPS optimization
1  0   User plane (UP) CIoT EPS optimization
1  1   Reserved

TABLE 10

Attach request message, TAU request message, or attach request message without PDN connection request
Strong/required CIoT EPS optimization solution
Bit
4  3
0  0   Additional information is not present
0  1   Control plane (CP) CIoT EPS optimization
1  0   User plane (UP) CIoT EPS optimization
1  1   Reserved Meanwhile, a network node (e.g., MME/SGSN) supporting the optimization solution strong/required by the CIoT device may transmit messages as illustrated in the following table to the CIoT device.

TABLE 11

Attach accept message or TAU accept message
Additional update result value (octet 1)
Control plane (CP) CIoT EPS optimization is accepted
0   Control plane (CP) CIoT EPS optimization is not accepted
1   Control plane (CP) CIoT EPS optimization is accepted
Or
User plane (UP) CIoT EPS optimization is accepted
0   User plane (UP) CIoT EPS optimization is not accepted
1   User plane (UP) CIoT EPS optimization is accepted

TABLE 12

Attach accept message, TAU accept message, or an attach accept message without PDN connection accept
Control plane (CP) CIoT EPS optimization is accepted
0   Control plane (CP) CIoT EPS optimization is not accepted
1   Control plane (CP) CIoT EPS optimization is accepted
Or
User plane (UP) CIoT EPS optimization is accepted
0   User plane (UP) CIoT EPS optimization is not accepted
1   User plane (UP) CIoT EPS optimization is accepted Meanwhile, if the optimization solution strong/required by the CIoT device is not supported by the network node (e.g., MME/SGSN), the network node (e.g., MME/SGSN) may include a cause field in a reject message shown below and transmit the same to the CIoT device.

TABLE 13

Attach reject message/TAU reject message/attach reject message without PDN connection reject
EMM cause
Extended EMM cause

TABLE 14

| EMM cause | | | | | | | | |
|---|---|---|---|---|---|---|---|---|
| 0 | 1 | 1 | 1 | 1 | 1 | 1 | 1 | CIoT EPS optimization is not supported |

TABLE 15

| | |
|---|---|
| Extended EMM cause | |
| Information regarding CIoT EPS optimization | |
| Bit | |
| 2 | |
| 0 | CIoT EPS optimization information is not present |
| 1 | CIoT EPS optimization is not supported |

The above-described proposals may be used in combination with each other.

The contents described so far may be implemented by hardware. This will be described with reference to the drawings.

Figure 12:
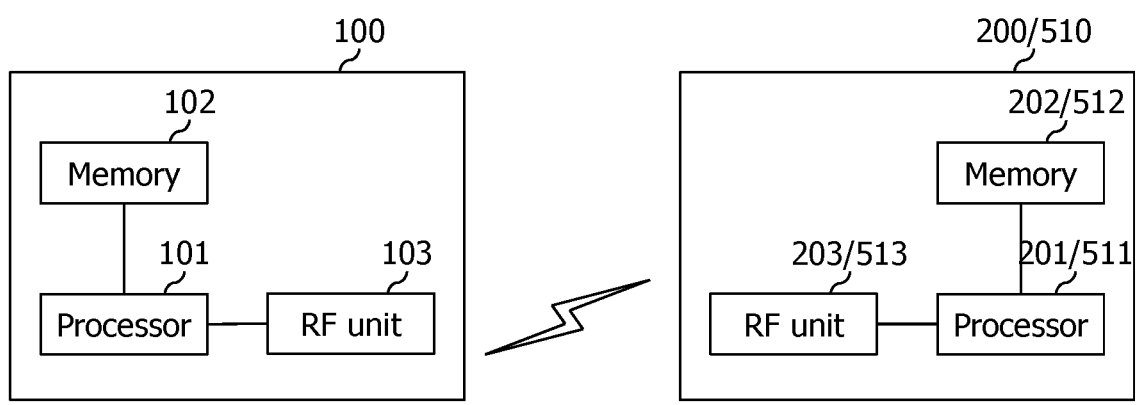
FIG. 12 is a block diagram of a CIoT device 100 and a network device according to an embodiment of the present invention.

FIG. 12 is a block diagram of a CIoT device 100 and a network device according to an embodiment of the present invention.

As illustrated in FIG. 12, the CIoT device 100 includes a processor 101, a memory 102, and a transceiver 103. Also, the network device may be the BS 200 or the MME/SGSN 510. The network device 200 or 510 includes a processor 201 or 511, a memory 202 or 512, and a transceiver 203 or 513.

The memories 102, 202, or 512 store the above-described method.

The processors 101, 201, or 511 control the memories 102, 202, or 512 and the transceivers 103, 203, or 513, respectively. Specifically, the processors 101, 201, or 511 execute the methods stored in the memories 102, 202, or 512, respectively. The processors 101, 201, or 511 transmit the above-described signals through the transceivers 103, 203, or 513.

Embodiments of the present invention have been described, but the scope of the present invention is not limited to the specific embodiments set forth herein and may be variously modified and improved within the scope of the appended claims of the present invention.

What is claimed is:

1. A method for transmitting a non-access stratum (NAS) signaling request message, the method performed by a wireless device and comprising:
    transferring, by an NAS layer of the wireless device, the NAS signaling request message to an access stratum (AS) layer of the wireless device to transmit the NAS signaling request message to a network node, wherein the NAS signaling request message includes an indication indicating at least one preferred or required optimization method among (i) optimizing an evolved packet system (EPS) using a control plane (CP) and (ii) optimizing the EPS using a user plane (UP) for a cellular Internet of things (CIoT);
    receiving, by the NAS layer of the wireless device from the AS layer, an NAS signaling accept message or an NAS signaling reject message from the network node, wherein based on the at least one preferred or required optimization method not being supported by the network node, the NAS signaling accept message or the NAS signaling reject message further includes a cause field, wherein based on receiving the NAS signaling reject message, the cause field indicates that the optimization method required by the CIoT device is not supported by a network;
    after the NAS signaling reject message is received, reattempting, by the NAS layer of the wireless device, to transfer the NAS signaling request message to the AS layer until a threshold number of re-attempts is reached; and
    performing, by the NAS layer of the wireless device, to select a public land mobile network (PLMN) that supports the optimization method required by the CIoT device.

2. The method of claim 1, wherein
    based on receiving the NAS signaling accept message, the cause field indicates that an optimization method not preferred by the CIoT device is used.

3. The method of claim 1, wherein
    based on receiving the NAS signaling reject message, the cause field indicates that any optimization method is not supported by a network.

4. The method of claim 1, wherein
    the NAS signaling request message includes at least one of (i) an attach request message, (ii) a tracking area update (TAU) request message, or (ii) a routing area update (RAU) request message,
    the NAS signaling accept message includes at least one of (i) an attach accept message, (ii) a TAU accept message, or (iii) an RAU accept message, and
    the NAS signaling reject message includes at least one of (i) an attach reject message, iii) a TAU reject message, or (iii) an RAU reject message.

5. A wireless device configured to transmit a non-access stratum (NAS) signaling request message, the wireless device comprising:
    a transceiver;
    at least one processor; and
    at least one computer memory operably connectable to the at least one processor and storing instructions that, based on being executed by the at least one processor, perform operations comprising:
    transferring, by an NAS layer of the wireless device, an NAS signaling request message to an access stratum (AS) layer of the wireless device to transmit the NAS signaling request message to a network node, wherein the NAS signaling request message includes an indication indicating at least one preferred or required optimization method among (i) optimizing an evolved packet system (EPS) using a control plane (CP) and (ii) optimizing the EPS using a user plane (UP) for a cellular Internet of things (CIoT);
    receiving, by the NAS layer of the wireless device from the AS layer, an NAS signaling accept message or an NAS signaling reject message from the network node, wherein based on the at least one preferred or required optimization method not being supported by the network node, the NAS signaling accept message or the NAS signaling reject message further includes a cause field, wherein based on receiving the NAS signaling reject message, the cause field indicates that the optimization method required by the CIoT device is not supported by a network;
    after the NAS signaling reject message is received, reattempting, by the NAS layer of the wireless device, to transfer the NAS signaling request message to the AS layer until a threshold number of re-attempts is reached; and
    performing, by the NAS layer of the wireless device, to select a public land mobile network (PLMN) that supports the optimization method required by the CIoT device.

6. The wireless device of claim 5, wherein
    based on receiving the NAS signaling accept message, the cause field indicates that an optimization method not preferred by the CIoT device is used.

7. The wireless device of claim 5, wherein
based on receiving the NAS signaling reject message, the cause field indicates that any optimization method is not supported by a network.

8. The wireless device of claim 5, wherein
the NAS signaling request message includes at least one of (i) an attach request message, (ii) a tracking area update (TAU) request message, or (iii) a routing area update (RAU) request message,
the NAS signaling accept message includes at least one of (i) an attach accept message, (ii) a TAU accept message, or (iii) an RAU accept message, and
the NAS signaling reject message includes at least one of (i) an attach reject message, (ii) a TAU reject message, or (iii) an RAU reject message.

9. A processing apparatus configured to control a wireless device to transmit a non-access stratum (NAS) signaling request message, the processing apparatus comprising:
at least one processor; and
at least one computer memory operably connectable to the at least one processor and storing instructions that, based on being executed by the at least one processor, perform operations comprising:
transferring, by an NAS layer of the wireless device, an NAS signaling request message to an access stratum (AS) layer of the wireless device to transmit the NAS signaling request message to a network node, wherein the NAS signaling request message includes an indication indicating at least one preferred or required optimization method among (i) optimizing an evolved packet system (EPS) using a control plane (CP) and (ii) optimizing the EPS using a user plane (UP) for a cellular Internet of things (CIoT);
receiving, by the NAS layer of the wireless device from the AS layer, an NAS signaling accept message or an NAS signaling reject message from the network node, wherein based on the at least one preferred or required optimization method not being supported by the network node, the NAS signaling accept message or the NAS signaling reject message further includes a cause field, wherein based on receiving the NAS signaling reject message, the cause field indicates that the optimization method required by the CIoT device is not supported by a network;
after the NAS signaling reject message is received, reattempting, by the NAS layer of the wireless device, to transfer the NAS signaling request message to the AS layer until a threshold number of re-attempts is reached; and
performing, by the NAS layer of the wireless device, to select a public land mobile network (PLMN) that supports the optimization method required by the CIoT device.

10. The processing apparatus of claim 9, wherein
based on receiving the NAS signaling accept message, the cause field indicates that an optimization method not preferred by the CIoT device is used.

11. The processing apparatus of claim 9, wherein
based on receiving the NAS signaling reject message, the cause field indicates that any optimization method is not supported by a network.

12. The processing apparatus of claim 9, wherein
the NAS signaling request message includes at least one of (i) an attach request message, (ii) a tracking area update (TAU) request message, or (iii) a routing area update (RAU) request message,
the NAS signaling accept message includes at least one of (i) an attach accept message, (ii) a TAU accept message, or (iii) an RAU accept message, and
the NAS signaling reject message includes at least one of (i) an attach reject message, (ii) a TAU reject message, or (iii) an RAU reject message.

* * * * *